US011055988B2

(12) United States Patent
Canepa et al.

(10) Patent No.: US 11,055,988 B2
(45) Date of Patent: Jul. 6, 2021

(54) SYSTEM AND METHOD FOR MONITORING TRAFFIC WHILE PRESERVING PERSONAL PRIVACY

(71) Applicant: KING ABDULLAH UNIVERSITY OF SCIENCE AND TECHNOLOGY, Thuwal (SA)

(72) Inventors: Edward Canepa, Thuwal (SA); Christian Claudel, Thuwal (SA); Atif Shamim, Thuwal (SA); Ahmad Dehwah, Thuwal (SA); Mustafa Mousa, Thuwal (SA); Jiming Jiang, Thuwal (SA)

(73) Assignee: KING ABDULLAH UNIVERCITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 14/421,840

(22) PCT Filed: Aug. 15, 2013

(86) PCT No.: PCT/IB2013/002259
§ 371 (c)(1),
(2) Date: Feb. 15, 2015

(87) PCT Pub. No.: WO2014/027247
PCT Pub. Date: Feb. 20, 2014

(65) Prior Publication Data
US 2015/0221217 A1    Aug. 6, 2015

Related U.S. Application Data

(60) Provisional application No. 61/684,553, filed on Aug. 17, 2012.

(51) Int. Cl.
G06F 21/00    (2013.01)
G08G 1/01    (2006.01)
(Continued)

(52) U.S. Cl.
CPC ......... *G08G 1/0125* (2013.01); *G08G 1/0112* (2013.01); *G08G 1/0116* (2013.01);
(Continued)

(58) Field of Classification Search
CPC .. H04W 24/08; H04L 5/0048; H04L 12/2626; H04L 63/04; H04L 61/609;
(Continued)

(56) References Cited

U.S. PATENT DOCUMENTS 5,526,357 A * 6/1996 Jandrell ............... G01S 5/0009
340/991
5,948,042 A * 9/1999 Heimann .............. G01C 21/32
701/117
(Continued)

FOREIGN PATENT DOCUMENTS

WO    WO 2012034169 A1 * 3/2012  ........... G05D 1/0291

OTHER PUBLICATIONS

Second Examination Report in related GC Application No. 2013-25165, dated Nov. 20, 2017.
(Continued)

*Primary Examiner* — Mahfuzur Rahman
(74) *Attorney, Agent, or Firm* — Patent Portfolio Builders PLLC

(57) ABSTRACT

A traffic monitoring system and method for mapping traffic speed and density while preserving privacy. The system can include fixed stations that make up a network and mobile probes that are associated with vehicles. The system and method do not gather, store, or transmit any unique or identifying information, and thereby preserves the privacy of members of traffic. The system and method provide real-time traffic density and speed mapping. The system and method can further be integrated with a complementary flood monitoring system and method.

43 Claims, 5 Drawing Sheets

(51) Int. Cl.
*H04L 29/06* (2006.01)
*G08G 1/052* (2006.01)
*H04L 29/12* (2006.01)

(52) U.S. Cl.
CPC .......... *G08G 1/0133* (2013.01); *G08G 1/0141* (2013.01); *G08G 1/052* (2013.01); *H04L 61/609* (2013.01); *H04L 63/04* (2013.01)

(58) Field of Classification Search
CPC .. G08G 1/0125; G08G 1/0141; G08G 1/0116; G08G 1/0133; G08G 1/052; G08G 1/0112
See application file for complete search history.

(56) References Cited

U.S. PATENT DOCUMENTS

| | | | | |
|---|---|---|---|---|
| 6,334,086 | B1* | 12/2001 | Park | G08G 1/0104 340/905 |
| 8,560,236 | B1* | 10/2013 | Zahir | G01C 21/20 701/533 |
| 2002/0072963 | A1 | 6/2002 | Jonge | |
| 2002/0173907 | A1* | 11/2002 | Ando | G08G 1/20 701/410 |
| 2004/0215373 | A1* | 10/2004 | Won | G08G 1/161 701/1 |
| 2007/0189181 | A1* | 8/2007 | Kirk | G01S 19/14 370/252 |
| 2008/0068267 | A1 | 3/2008 | Huseth et al. | |
| 2009/0140887 | A1* | 6/2009 | Breed | G01C 21/165 340/990 |
| 2009/0326791 | A1 | 12/2009 | Horvitz et al. | |
| 2010/0082230 | A1* | 4/2010 | Hong | G01C 21/362 701/533 |
| 2010/0125407 | A1* | 5/2010 | Cho | G01C 21/3602 701/533 |
| 2011/0095908 | A1 | 4/2011 | Nadeem et al. | |
| 2011/0106428 | A1* | 5/2011 | Park | G01C 21/3647 701/533 |
| 2011/0130959 | A1* | 6/2011 | Hwang | G01C 21/3614 701/533 |
| 2011/0320111 | A1 | 12/2011 | Sarma et al. | |
| 2012/0092187 | A1* | 4/2012 | Scholl | G08G 1/04 340/905 |
| 2012/0190386 | A1* | 7/2012 | Anderson | G01C 15/04 455/456.3 |
| 2014/0288811 | A1* | 9/2014 | Oura | G08G 1/0116 701/119 |
| 2015/0002620 | A1* | 1/2015 | Shin | G06K 9/00805 348/36 |
| 2015/0161992 | A1* | 6/2015 | Jung | G10L 15/083 704/251 |
| 2016/0360364 | A1* | 12/2016 | Lin | H04W 4/023 |
| 2017/0162053 | A1* | 6/2017 | Margalef Valldeperez | G08G 1/164 |

OTHER PUBLICATIONS

Examination Report in related GC Application No. 2013-25165, dated Aug. 2, 2017 (Citations D1, D2, D4 and D9 were cited in the Office Action dated Nov. 19, 2015.
CA Examiner's Report in corresponding/related CA Application No. 2,881,198, dated Jul. 11, 2019 (Documents D1-D2 were cited in PTO-892 dated Nov. 19, 2015 and Document D3 was cited in an IDS dated Aug. 17, 2017).
Communication pursuant to Article 94(3) EPC in corresponding/related EP Application No. 138292073, dated Oct. 7, 2019.

* cited by examiner

Figure 1a

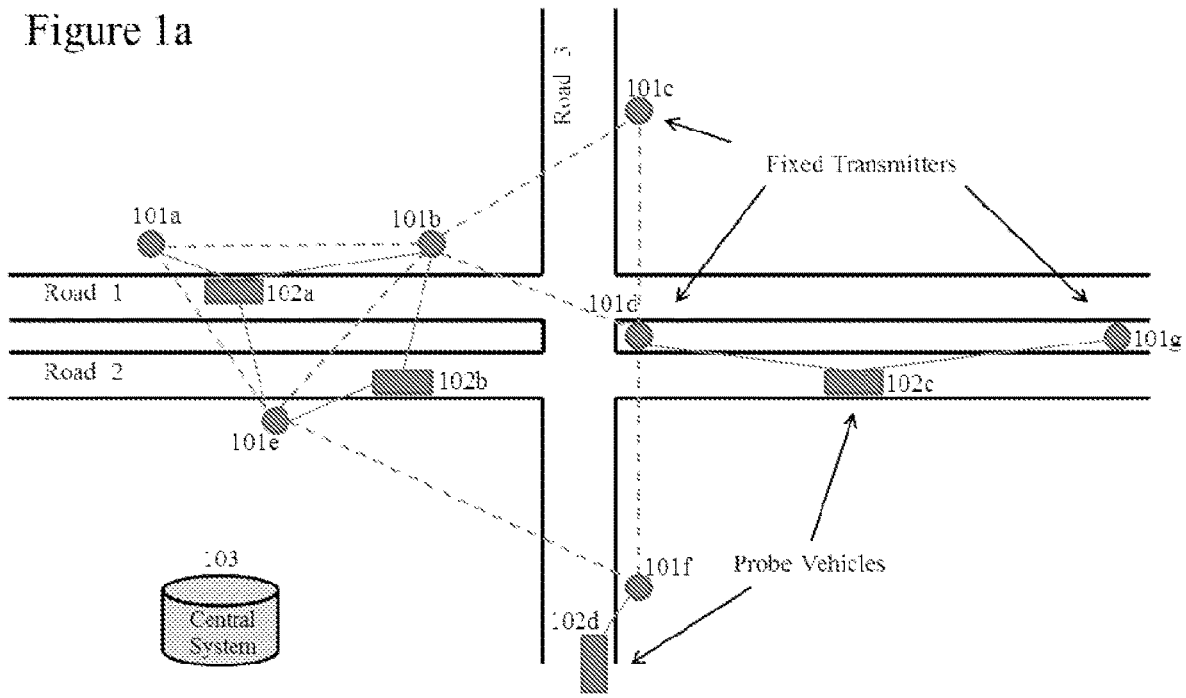

Figure 1b

| 101a | A traffic monitoring system for monitoring and mapping traffic flow while preserving privacy, wherein the traffic monitoring system does not collect or store any personal identifying information. ||
|---|---|---|
| | 104 | 105 |
| | a mobile transmitter comprising a transmitter microcontroller and a wireless transmitter | a fixed transmitter infrastructure comprising stations with fixed locations, wherein each of the stations comprises a station microcontroller and a wireless |

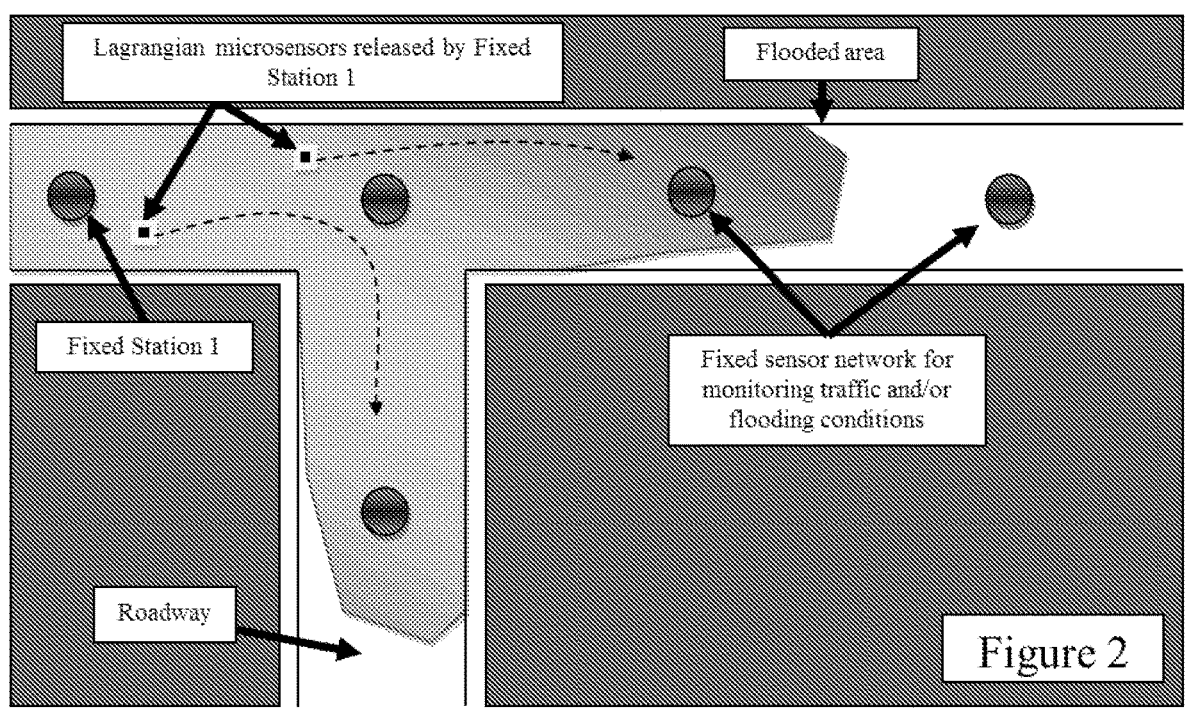

SYSTEM AND METHOD FOR MONITORING TRAFFIC WHILE PRESERVING PERSONAL PRIVACY

CLAIM OF PRIORITY

This application claims the benefit of prior under 35 USC 371 to International Application No. PCT/IB2013/002259, filed Aug. 15, 2013, which claims priority to U.S. Provisional Application No. 61/684,553, filed Aug. 17, 2012, each of which is incorporated by reference in its entirety.

TECHNICAL FIELD

The present invention is directed to a probe-based system and method for monitoring, estimating, and mapping traffic flow while preserving personal privacy.

BACKGROUND

Prior probe-based traffic monitoring systems have not offered privacy guarantees. For instance, in transponder-based systems, such as the Fastrak system operating in the San Francisco Bay area of California, traffic conditions are inferred on a roadway by reidentification of the transponder's unique identification. This can allow an operator of the monitoring infrastructure to identify and track specific vehicles. Other types of systems that fail to preserve privacy are systems based on global positioning satellite (GPS) tracking. GPS systems potentially expose even more personal data because they allow complete position traces to be sent to a centralized server, and these systems transmit other personal identifying information containing sensitive information. Moreover, even completely anonymous GPS traces are very vulnerable to attack. An example of an attempt to solve privacy issues is the "virtual trip line" concept by Nokia. However, this attempt also does not offer privacy guarantees, and privacy intrusion is still technically possible.

In addition to privacy concerns, the prior art probe-based systems are costly, requiring relatively large initial investments. Some prior art systems, further require monthly subscriber fees for connecting its sensor device to cellular networks.

SUMMARY

A system for monitoring traffic flow is provided that preserves privacy by utilizing low costs transmitter probes.

The traffic monitoring system and method can preserve privacy of vehicles and occupants by communicating only non-unique data associated with anonymous vehicle position and/or speed. The data generated by a vehicle does not propagate beyond the immediate surroundings of the vehicle. The only data sent back to the central server is velocity, density, and/or flow data, which do not contain any information on individual vehicles and thus cannot be compromised, and no attacker located beyond the radio range of the vehicle's transmitter can reconstruct the trajectory of a vehicle.

In one aspect, a method of monitoring traffic data while preserving privacy can include receiving a transmitter signal from a transmitter, estimating a position of the transmitter, and mapping the position to a roadway. In certain embodiments, the signal can comprise positional and speed information of the transmitter but no personal identifying information is transmitted.

In some embodiments, the method can include powering the transmitter from a power system of a vehicle. The method can include recording a result of estimating the position or mapping the position. The method can include estimating a state of traffic on the roadway, wherein the estimating can be based on the result. The state can be estimated by a data fusion technique, which can be a mathematical method such as mixed-integer linear programming. The estimated states can be traffic density, traffic flow, traffic velocity, and/or density and speed maps. An estimated state can be sent to a database, which can be sent to the database using multi-hop communications between fixed nodes of a fixed transmitter infrastructure. Further, the transmitter can relay and/or forward only estimated traffic states to fixed nodes of a fixed transmitter infrastructure.

In another aspect, a traffic monitoring system for monitoring and mapping traffic flow while preserving privacy can include a mobile transmitter with a transmitter microcontroller and a wireless transmitter. The traffic monitoring system can include a fixed transmitter infrastructure with stations having fixed locations. Each of the stations can include a station microcontroller and a wireless station transmitter, and the mobile transmitter and the fixed transmitter infrastructure can be tuned to operate on the same frequency. The traffic monitoring system does not collect or store any personal identifying information.

In some embodiments, the mobile transmitter can be integrated into a vehicle. The mobile transmitter can be powered by the vehicle, and the mobile transmitter can be configured to obtain vehicle speed data from the vehicle. The mobile transmitter can comprise a back end and a front end. The back end of the mobile transmitter can transform data from the vehicle into an appropriate form which can be suitable for modulation onto a wireless carrier. An example of a back end function can be conversion of an analog speed signal from the vehicle to a digital format. The front end of the mobile transmitter can comprise an integrated circuit (IC) mounted on, for example, an inkjet printed circuit board. The IC can further have an integrated antenna. The board can be an existing part of the vehicle, for example an inner part of the plastic cover over a side mirror. The fixed transmitter infrastructure can be configured to receive data from the mobile transmitter, to estimate a position of the vehicle, and to map the position to a road. In some embodiments, the traffic monitoring system can include at least one additional mobile transmitter, and the fixed transmitter infrastructure can be configured to monitor any or all of the mobile transmitter and the one additional mobile transmitter when whichever of the mobile transmitter and the at least one additional mobile transmitter are within communication range, and the traffic monitoring system can be configured to create traffic data based on the monitoring. The traffic data can include a density and speed map. The traffic monitoring system can be configured to estimate a state of local traffic based on the traffic data. The traffic monitoring system can be configured to estimate a state of local traffic using a data fusion technique. The data fusion technique can be mixed-integer linear programming. Any and all of the mobile transmitter the at least one additional mobile transmitters can be vehicle components, but they are not configured to store or gather personal identifying information.

In some embodiments the traffic monitoring system can have at least one additional mobile transmitter wherein the transmitter and the at least one additional transmitter are configured to communicate with one another. The transmitter and the at least one additional transmitter can be configured to act as relays for forwarding data to the station when one or more of the transmitter and the at least one additional transmitter are beyond communication range of the fixed transmitter infrastructure. The fixed location. The fixed transmitter infrastructure can be configured to receive data from the mobile transmitter, estimate a position of the mobile transmitter, and/or map the position. The fixed transmitter infrastructure can be configured to monitor the mobile transmitter when the mobile transmitter can be within communication range, and the traffic monitoring system can be configured to create traffic data based on the monitoring. The traffic monitoring system does not collect or store any personal identifying information. The traffic monitoring system can be configured to estimate a state of local traffic based on the traffic data, and the traffic monitoring system can be configured to estimate the state of local traffic using mixed-integer linear programming.

In another aspect, a method of monitoring traffic data while preserving privacy can include providing at least one transmitter and providing a fixed transmitter infrastructure. Each of the at least one transmitter can have a transmitter microcontroller and a transmitter half duplex wireless transmitter. The fixed transmitter infrastructure can have at least one fixed station, and each of the at least one fixed station can have a fixed station microcontroller and either a fixed station half duplex wireless transmitter or a fixed station full duplex wireless transmitter. The method can have the further step of integrating each of the at least one transmitter into separate vehicles, and each of the at least one transmitter can be powered by the vehicle into which the at least one transmitter is integrated. The fixed transmitter infrastructure and each of the at least one transmitter can be tuned to operate on the same frequency. The method can have the further steps of measuring vehicle speed and vehicle position of each vehicle within the communication range of the fixed transmitter infrastructure or the at least one transmitter and mapping the position of each vehicle. Each of the at least one transmitter can act as a relay when outside the communication range of the fixed transmitter infrastructure in order, for example, to forward measured data to a database using multi-hop communications. No personal identifying information is collected or stored during the method of monitoring traffic data, such as speed and density.

Other aspects, embodiments, and features will be apparent from the following description, the drawings, and the claims.

DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 1*a* illustrates an exemplary representation of a traffic monitoring system for monitoring and mapping traffic flow while preserving privacy.

FIG. 1*b* illustrates an exemplary representation of a traffic monitoring system for monitoring and mapping traffic flow while preserving privacy.

FIG. 2 illustrates an exemplary representation of a monitoring system for monitoring and mapping both traffic conditions and flooding conditions.

DETAILED DESCRIPTION

Figure 3:
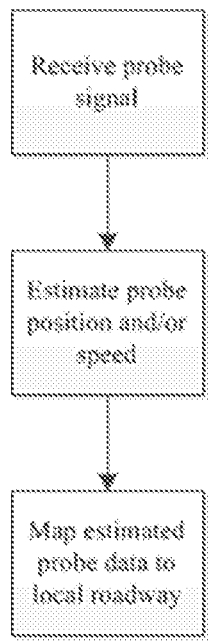
FIG. 3 illustrates an exemplary representation of a monitoring method for monitoring and mapping traffic conditions while preserving privacy.

A detailed explanation of the system and method according to the preferred embodiments of the present invention are described below.

As one skilled in the art will appreciate, embodiments of the present invention may be embodied as, among other things: a method, an apparatus, a system, or computer-program products. Accordingly, the embodiments may take the form of a hardware embodiment, a software embodiment, or an embodiment combining software and hardware. The present invention can take the form of a computer-program product that includes computer-useable instructions embodied on one or more computer-readable microsensor can have overlapping meanings and describe overlapping or equivalent technologies or products, and therefore, may be used interchangeably. Such terms are intended to invoke their specific meaning and their general meaning, as well as any overlapping or equivalent meanings, technologies or products.

The traffic monitoring system and method preserve the privacy of vehicles and occupants by not communicating personal identifying information and by not gathering or transmitting unique identifying data. Thus the system cannot be compromised, preventing the tracking of specific travelers and the leaking of personal information. Moreover, data generated by a vehicle does not propagate beyond the immediate surroundings of the vehicle (the area on which this data is available is a function of the range of the fixed and mobile transmitters). The only data sent back to the central server is velocity, density, and/or flow data, which do not contain any information on individual vehicles and thus cannot be compromised. Thus, no attacker located beyond the radio range of the vehicle's transmitter can reconstruct the trajectory of a vehicle, which is not the case for traditional systems as all data is sent to a central server which can be attacked. From the position and/or speed information, the invention can estimate, extrapolate, and/or report traffic density and traffic flow information. Moreover, transmitter probes and a receiver infrastructure are tuned to one or more frequencies that are not shared by other communication devices such as cellular phones or other wireless devices. In other words, the contemplated invention does not merely multiplex or piggyback signals with existing wireless devices. Thus, personal identifying information is entirely excluded, not merely excludable, from the system and method.

The traffic monitoring system and method can advantageously utilize low-cost transmitter probes that are inexpensive to produce and incorporate into vehicles. Moreover, the system and method do not require ongoing maintenance or subscription fees.

Embodiments can include a system and method for monitoring traffic conditions, for example speed and density of traffic. Embodiments can include systems and methods for monitoring some conditions while standing by in preparation for other monitoring conditions. Although not a requirement, some embodiments can incorporate a modular system and/or method for monitoring flooding conditions, such as water height, flow rate and flow path. Such alternative embodiments can include an integrated system and/or Further, some embodiments advantageously synthesize multiple functions into a compact, single system and method. For example embodiments can include, transducers configured to measure either or both traffic and flooding conditions. Embodiments can include monitoring transmitted signals as well as directly measuring conditions with an active device, such as an ultrasonic transducer.

Referring to the traffic monitoring system for monitoring and mapping traffic flow of FIG. 1a, an embodiment is shown having low-cost fixed base stations (101a-101g) that can be positioned in proximity to roadways, such as Road 1, Road 2 and Road 3. Each fixed base station can be a node of a fixed network, which can be hardwired or wireless. The dashed lines between nodes are representative of the communication links between base stations. Each fixed base station can have a microcontroller and a half- or full-duplex wireless transmitter.

Referring to the traffic monitoring system for monitoring and mapping traffic flow of FIG. 1a, mobile transmitters, or probes, can be incorporated into vehicles (102a-102d). Each of the probes can have a microcontroller and a half- or full-duplex wireless transmitter, and the wireless transmitters can be tuned to the frequency of the wireless transmitters associated with the fixed network, thus allowing communication between discrete elements of traffic flow and fixed base stations. The solid lines between nodes and probe vehicles are representative of the communication links between base stations and mobile transmitters. A transmitter can be permanently integrated with or removably attached to a vehicle, and the vehicle can supply the power requirements of the transmitter components. Additionally, the transmitter can be integrated with rechargeable electronic devices without compromising privacy. This is because the transmitters operate on dedicated frequencies and do not gather and cannot use personal identifying signals. Mobile transmitters can comprise back ends and front ends. The back end of a mobile transmitter can transform data, for example speed, from a vehicle into another form which is suitable for modulation onto a wireless carrier. An example of a back end function can be conversion of an analog speed signal from the vehicle to a digital speed signal. The front end of the mobile transmitter can comprise an integrated circuit (IC) mounted on, for example, an inkjet printed circuit board (PCB). The IC or the PCB can have an integrated antenna. The PCB or a housing of a mobile transmitter can be an existing part of the vehicle, for example the inner part of the driver side minor plastic cover.

Referring again to FIG. 1a, the fixed network can further be realized with a database, a server, or a processing station (103) (hereinafter "Central System"). The Central System can be configured to receive information from the fixed network by wired or wireless communications techniques. The Central System can further be configured to gather and/or analyze data from the fixed network and to provide mapped information describing density and speed of either local roadways or systems of roadways. Although depicted as a single centralized database, the Central System can be realized by utilizing a plurality of distributed processing systems. It may also be realized as a computer program operating within the fixed network.

FIG. 1a also illustrates a privacy preserving process. For instance the data sent by car 102b can only received by fixed nodes 101e and 101b, which can estimate the density and/or speed on road 2 around the vehicle 102b. The density and/or speed information can then be sent to a central server, for example from 101e to 101b to 101d to 101g, but this information does not allow an attacker to infer anything about the vehicle 102b, which would not be the case if the position of 102b was sent to 101g.

A traffic monitoring system for monitoring and mapping traffic flow is shown in FIG. 1b. An embodiment for monitoring and mapping traffic flow while preserving privacy (101a) can have a mobile transmitter (104) having a transmitter microcontroller and a wireless transmitter. The embodiment can also have a fixed transmitter infrastructure (105) having stations with fixed locations. The traffic monitoring system does not collect or store any personal identifying information. Each of the stations can have station microcontrollers and/or wireless station transmitters. The mobile transmitter and the fixed transmitter infrastructure can be tuned to operate on the same frequency.

Embodiments can be improved by utilizing low-cost and short range transmitters placed in vehicles and low-cost, low-powered fixed base stations located around the roadways or highways to be monitored. Fixed base stations can be standalone devices, or they can be installed on existing structures such as light poles, poles for power and/or telephone lines, or on other convenient existing structures.

An alternative embodiment for the fixed network of FIG. 1a can have further installed a modular system for additional traffic monitoring and/or monitoring of flooding conditions. The modular system can have sensor boards, which can be connected to ultrasonic transducers pointing towards the ground or at roads to be monitored. Each conditions. In addition to traffic monitoring, the ultrasonic transducers, or transceivers, can be configured to measure local flooding conditions. Local traffic conditions measured or analyzed can be local density, flow and velocity conditions across a roadway. Local flood conditions measured or analyzed can be the estimated height of water over the ground. The fixed network can be configured to detect and analyze either or both traffic and flooding.

In some embodiments, a transmitter can be placed in a vehicle. The transmitter can broadcast the vehicle speed and/or vehicle position. The corresponding signal can be received by one or more local base stations, which can estimate the vehicle position and can map the vehicle's position to a local road. A state of traffic on multiple roads can then be jointly estimated using the data recorded by the local base stations. The system can also use data fusion techniques, for instance density estimation using mixed-integer linear programming. Traffic estimates do not contain any privacy-intrusive information, as they only consist of speed and/or density maps. The data can then be forwarded to a database using, for example, multi-hop communication techniques between the nodes of the network. Mobile transmitters inside vehicles can act as relays, storing and/or forwarding estimated states, such as traffic density, traffic flow, traffic velocity, density and speed maps, and/or flood conditions to nodes. This can be especially useful as a backup, when connectivity between fixed nodes is lost, or when probes are beyond the communication range of the base station infrastructure.

The fixed network can receive a transmitter signal and directly measure and estimate a position of the transmitter. The system can then map the position of the transmitter to a roadway. In any embodiment, the probe can be powered by a power system of a vehicle, for example, a battery or electrical system of a vehicle. The fixed network can further analyze speed and density data or send data to a database or processor for analysis, such as estimating and mapping.

A server system can process data corresponding to local traffic and/or local flooding conditions, which can be relayed by sensor nodes. Global traffic conditions can then be estimated using traffic flow models and/or origin-destination models. Maps of current and future traffic flow conditions can be created by the system. In the alternative embodiment containing sensors for flood monitoring, global flooding conditions can be provided using data generated by the ultrasonic transducers. Global flooding conditions can also be forecasted using, inter alia, current conditions, meteorological data and/or sewer models.

Additionally, the system of the alternative embodiment can monitor and/or forecast the height of water on roads during floods, enabling local authorities to assess which roads are impassable (for general vehicles) and which roads are fordable by relief vehicles or other high-clearance vehicles. Based on the monitored data, the system can generate of a map of usable roads (and accessible areas) for emergency services in real time, which is critical information during floods (in particular flash flood events).

The fixed network can be configured to analyze traffic and/or flooding at the nodes of the network or at a database. The probes can be measured by the fixed base stations or by the network. Additionally, the probes can be configured to transmit measurement data to the network.

The system and method can measure probe positions by trilateration and/or the received signal strength. Probe positions can be additionally, or alternatively, measured by the probe itself with a tracking device coupled to the transmitter. This positional data can then be transmitted to the network. Because the data generated by probes does not propagate beyond the immediate surroundings of the probe and the only data transmitted along the network is position and/or speed data, rather than any unique identifier, the system and method preserve privacy.

Referring now to FIG. 2, the system and method can incorporate another modular system and/or method utilizing Lagrangian sensors. Although this modular component is not required, this modular component can be incorporated with the several embodiments above. The incorporation of Lagrangian sensors, or microsensors, can facilitate monitoring of flooding conditions by the fixed network.

Lagrangian microsensors can be implemented in system-on-package (SoP) platforms. An SoP can contain a custom transmitter chip, an efficient antenna, a memory with a unique identification (ID), a controller circuit and a power source, for example a miniaturized battery. The transmitter chip can be realized through low-cost complementary metal oxide semiconductor (CMOS) processes. The transmitter circuits can be low-powered as well as flexible enough to communicate data to the fixed sensors through, for example, modulation techniques. The transmitter chip can be placed in a cavity in a multilayer packaging material, for example a liquid crystal polymer (LCP).

There are several advantages to using multilayer packaging materials. For example, they can provide a hermetic seal for Lagrangian microsensors. This can protect the microsensors floating in water. They can further provide efficient and omnidirectional antennae. Multilayer packaging material, for example LCP, can be organic in nature and therefore environmental friendly. Multilayer packaging materials such as LCP can provide a disposable solution for Lagrangian microsensors. A small battery can be encapsulated in the LCP package as well. The SoP can be small, thin and lightweight to ease its floating operation in floodwater.

The Lagrangian microsensors can be released by the fixed base stations whenever they are needed to improve the accuracy of the real-time flood estimation process ("nowcast"), the inverse modeling process or the forecast process. Moreover, the fixed flood sensor network itself can be configured to automatically release the microsensors upon flooding. The motion of these transmitters can be tracked by the fixed network, and the resulting data can be combined with the data generated by the fixed ultrasonic components. The motion of the Lagrangian microsensors can be obtained from several methods, for example trilateration by the fixed sensor network and/or received signal strength measuring by the fixed sensor network. Also, the SoP can be equipped with onboard tracking devices that transmit data.

The data generated by the Lagrangian microsensors can include position, path and speed data. Any or all of these data types can improve the accuracy of the monitoring and analysis, including inverse modeling and forecast processes.

While measuring the level of flood water can be relatively easy using remote level sensors (such as acoustic rangefinders), measuring the velocity of a flood water stream can be a much more complex and expensive task since flood water is typically very dirty, containing large amounts of debris. Mechanical or pressure-based flow sensors have to be in the water stream to function, and are particularly prone to clogging. Acoustic flow sensors also have to be in the water stream to function, and would have to be protected against impact of debris, further increasing costs. Laser based flow sensors are very expensive and power consuming, which increases the total cost of the sensing infrastructure. They also pose a safety hazard in cities. In contrast, Lagrangian microsensors can be inexpensive sensors, requiring no maintenance and no special protection. Their low mass can make them very resilient to impacts, and they can be water flow sensors), their relatively low cost and the relatively low occurrence of floods make them a viable solution to the problem of sensing water velocity during floods. In contrast to other sensors, Lagrangian sensors do not require any periodic maintenance or checks, which can further reduce costs.

An embodiment of the method for monitoring and mapping traffic conditions while preserving privacy can be seen in FIG. 3. The method represented by the figure can be accomplished by receiving probe data at a node of the fixed network. Position and/or speed information can then be estimated by an individual node or can be estimated by the node network through a distributed computing process. Next, a mapping step can be made to describe traffic conditions of a local roadway or global traffic conditions.

Figure 4:
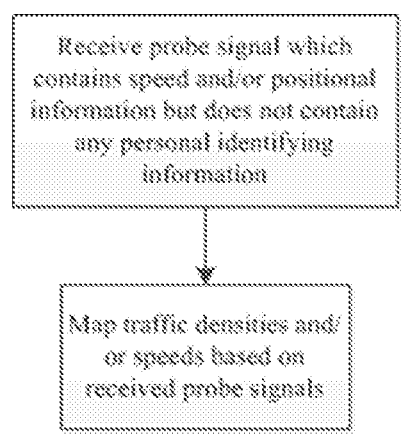
FIG. 4 illustrates an exemplary representation of a monitoring method for monitoring and mapping traffic conditions while preserving privacy.

An embodiment of the method for monitoring and mapping traffic conditions while preserving privacy can be seen in FIG. 4. The method represented by the figure can be accomplished by receiving a probe signal containing speed and/or positional information. Because the probe is not coupled to a phone or GPS, or similar device which gathers personal identifying information, the transmitted signal that is received does not contain any personal identifying information. Next traffic densities and/or speed can be mapped. In a preferred embodiment, mapping can be associated with a local roadway or a system of roadways, and it can be done by the fixed network. In an alternative embodiment, mapping can be accomplished by a centralized processor.

Figure 5:
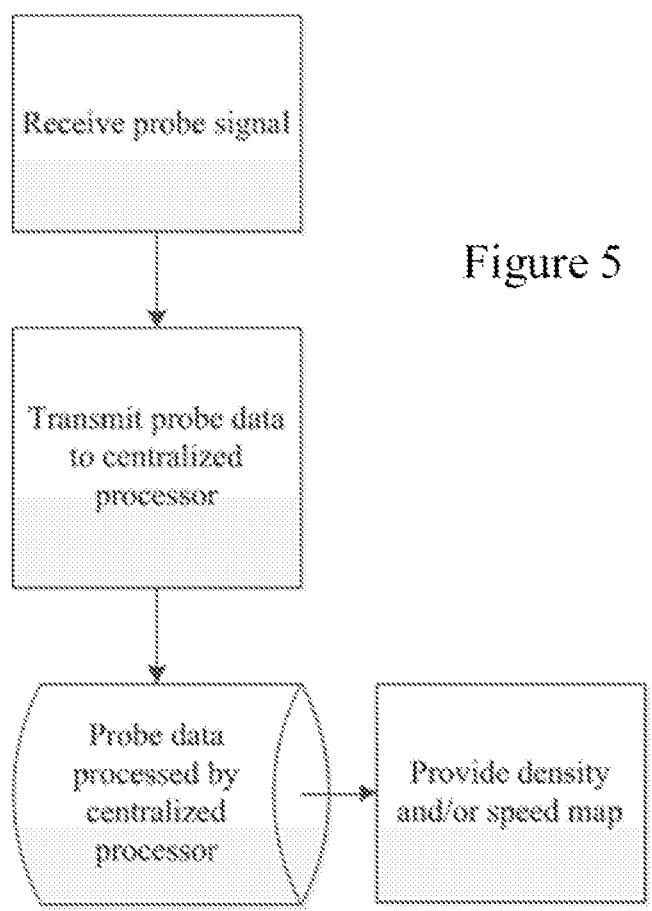
FIG. 5 illustrates an exemplary representation of a monitoring method for monitoring and mapping traffic conditions while preserving privacy.

An alternative embodiment of the method for monitoring and mapping traffic conditions while preserving privacy can be seen in FIG. 5. The method represented by the figure can be accomplished by receiving probe data at one or more nodes of the fixed network. The probe data can be transmitted to a database or centralized processing system. The centralized system can analyze the data and provide density and/or speed mapping. The transmission of probe data is only performed to the adjacent nodes of the fixed network (not beyond), and thus not to the central server.

Figure 6:
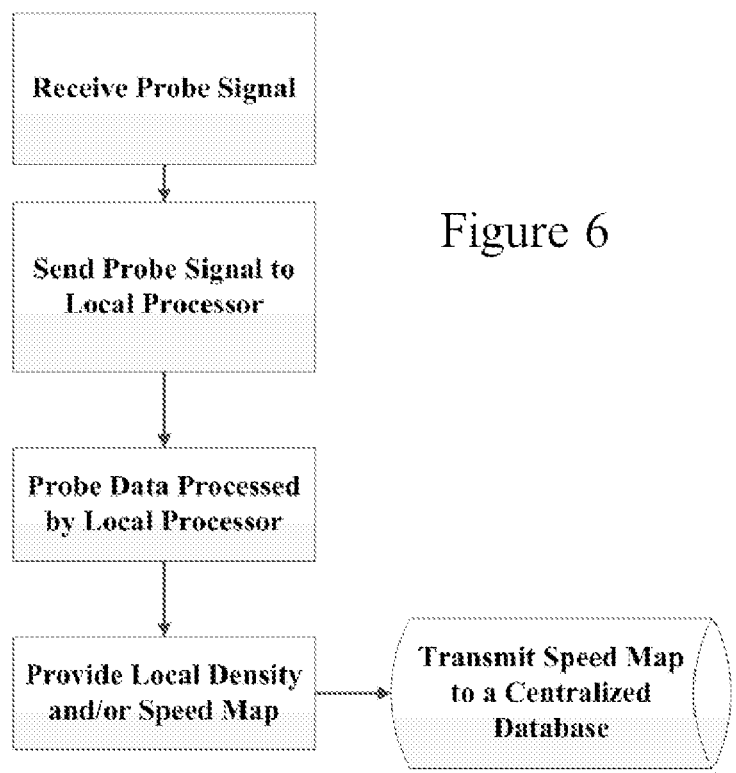
FIG. 6 illustrates an exemplary representation of a monitoring method for monitoring and mapping traffic conditions while preserving privacy.

A preferred embodiment of the method for monitoring and mapping traffic conditions while preserving privacy can be seen in FIG. 6. In this embodiment, probe data is not processed by a centralized processor, but it is processed by the fixed infrastructure itself, for example, by the nodes near the location of the vehicle. A probe signal can be received at a node. The signal can be sent to a local processor. Probe data can be processed by the local processor, for example, to provide local density, speed, These nodes can send to the centralized server speed, density, and/or flow maps from which no personal information can be inferred. The node system can monitor traffic data, for example, in order to locally estimate its state. The nodes can be configured to receive data from mobile transmitters, estimate a position of the mobile transmitter, and map positions and states. Thereafter, the node system can send map data to a database. Node transmitters can, for example, act as relays in order to forward measured data to a database using multi-hop communications.

It should be understood that embodiments can have some or all of the method steps represented in FIGS. 3-6. Moreover, single embodiments can have some or all steps represented in one of the figures in addition to some or all steps represented in other figures.

The various techniques, methods, and systems described above can be implemented in part or in whole using computer-based systems and methods. Additionally, computer-based systems and methods can be used to augment or enhance the functionality described above, increase the speed at which the functions can be performed, and provide additional features and aspects as a part of or in addition to those described elsewhere in this document. Various computer-based systems, methods and implementations in accordance with the above-described technology are presented below.

In one implementation, a general-purpose computer can have an internal or external memory for storing data and programs such as an operating system (e.g., DOS, Windows 2000™, Windows XP™, Windows NT™, OS/2, iOS, UNIX or Linux) and one or more application programs. Examples of application programs include computer programs implementing the techniques described herein, authoring applications (e.g., word processing programs, database programs, spreadsheet programs, simulation programs, engineering programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer or Google Chrome) capable of rendering standard Internet content and other content formatted according to standard protocols such as the Hypertext Transfer Protocol (HTTP), HTTP Secure, or Secure Hypertext Transfer Protocol.

One or more of the application programs can be installed on the internal or external storage of the general-purpose computer. Alternatively, in another implementation, application programs can be externally stored in or performed by one or more device(s) external to the general-purpose computer.

The general-purpose computer includes a central processing unit (CPU) for executing instructions in response to commands, and a communication device for sending and receiving data. One example of the communication device is a modem. Other examples include a transceiver, a communication card, a satellite dish, an antenna, a network adapter, network interface card, mobile internet device, or some other mechanism capable of transmitting and receiving data over a communications link through a wired or wireless data pathway.

The general-purpose computer can include an input/output interface that enables wired or wireless connection to various peripheral devices. Examples of peripheral devices include, but are not limited to, a mouse, a mobile phone, a personal digital assistant (PDA), a smartphone, a tablet computer, a keyboard, a display monitor with or without a touch screen input, and an audiovisual input device. In another implementation, the peripheral devices can themselves include the functionality of the general-purpose computer. For example, the mobile phone or the PDA can include computing and networking capabilities and function as a general purpose computer by accessing the delivery network and communicating with other computer systems. Examples of a delivery network include the Internet, the World Wide Web, WANs, LANs, analog or digital wired and wireless telephone networks (e.g., Public Switched Telephone Network (PSTN), Integrated Services Digital Network (ISDN), or Digital Subscriber Line (xDSL)), radio, television, cable, or satellite systems, and other delivery mechanisms for carrying data. A communications link can include communication pathways that enable communications through one or more delivery networks.

In one implementation, a processor-based system (e.g., a general-purpose computer) can include a main memory, preferably random access memory (RAM), and can also include a secondary memory. The secondary memory can include, for example, a hard disk drive or a removable storage drive, representing a floppy disk drive, a magnetic tape drive, an optical disk drive (Blu-Ray, DVD, CD drive), magnetic tape, paper tape, punched cards, standalone RAM disks, solid state drive, or flash memory devices drive reads from or writes to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the secondary memory can include other similar means for allowing computer programs or other instructions to be loaded into a computer system. Such means can include, for example, a removable storage unit and an interface. Examples of such can include a program cartridge and cartridge interface (such as can be found in video game devices), a removable memory chip (such as an EPROM or PROM) and associated socket, and other removable storage units and interfaces, which allow software and data to be transferred from the removable storage unit to the computer system.

In one embodiment, the computer system can also include a communications interface that allows software and data to be transferred between the computer system and external devices. Examples of communications interfaces can include a modem, a network interface (such as, for example, an Ethernet card), a communications port, and a PCMCIA slot and card. Software and data transferred via a communications interface are in the form of signals, which can be electronic, electromagnetic, optical or other signals capable of being received by a communications interface. These signals are provided to a communications interface via a channel capable of carrying signals and can be implemented using a wireless medium, wire or cable, fiber optics or other communications medium. Some examples of a channel can include a phone line, a cellular phone link, an RF link, a network interface, and other suitable communications channels.

In this document, the terms "computer program medium" and "computer usable medium" are generally used to refer to media such as a removable storage device, a disk capable of installation in a disk drive, and signals on a channel. These computer program products provide software or program instructions to a computer system.

Computer programs (also called computer control logic) are stored in main memory or secondary memory. Computer programs can also be received via a system to perform the features as discussed herein. In particular, the computer programs, when executed, enable the processor to perform the described techniques. Accordingly, such computer programs represent controllers of the computer system.

In an embodiment where the elements are implemented using software, the software can be stored in, or transmitted via, a computer program product and loaded into a computer system using, for example, a removable storage drive, hard drive or communications interface. The control logic (software), when executed by the processor, causes the processor to perform the functions of the techniques described herein.

In another embodiment, the elements are implemented primarily in hardware using, for example, hardware components such as PAL (Programmable Array Logic) devices, application specific integrated circuits (ASICs), or other suitable hardware components. Implementation of a hardware state machine so as to perform the functions described herein will be apparent to a person skilled in the relevant art(s). In yet another embodiment, elements are implanted using a combination of both hardware and software. In another embodiment, the computer-based methods can be accessed or implemented over the World Wide Web by providing access via a Web Page to the methods described herein. Accordingly, the Web Page is identified by a Universal Resource Locator (URL). The URL denotes both the server and the particular file or page on the server. In this embodiment, it is envisioned that a client computer system interacts with a browser to select a particular URL, which in turn causes the browser to send a request for that URL or page to the server identified in the URL. Typically the server responds to the request by retrieving the requested page and transmitting the data for that page back to the requesting client computer system (the client/server interaction is typically performed in accordance with the hypertext transport protocol or HTTP). The selected page is then displayed to the user on the client's display screen. The client can then cause the server containing a computer program to launch an application to, for example, perform an analysis according to the described techniques. In another implementation, the server can download an application to be run on the client to perform an analysis according to the described techniques.

Other embodiments are within the scope of the following claims.

The invention claimed is:

1. A method of monitoring traffic data while preserving privacy, comprising:
receiving at a fixed base station a transmitter signal from a transmitter associated with a vehicle, wherein the transmitter signal comprises speed information of the vehicle and wherein no personal identifying information associated with the vehicle and occupants of the vehicle is transmitted;
estimating with a processor of the fixed base station a position of the transmitter; and
mapping the position to a roadway to create traffic data, wherein the transmitter and the fixed base station are tuned on one or more frequencies that are not shared by cellular phones, and
wherein the traffic data comprises a density and speed map.

2. The method of monitoring traffic data while preserving privacy of claim 1, further comprising powering the transmitter from a power system of the vehicle.

3. The method of monitoring traffic data while preserving privacy of claim 1, further comprising: recording a result of estimating the position or mapping the position.

4. The method of monitoring traffic data while preserving privacy of claim 3, further comprising: estimating a state of traffic on the roadway, wherein the state is estimated based on the result.

5. The method of monitoring traffic data while preserving privacy of claim 4, wherein the state is estimated by a data fusion technique.

6. The method of monitoring traffic data while preserving privacy of claim 5, wherein the estimated state comprises density and the data fusion technique is mixed-integer linear programming.

7. The method of monitoring traffic data while preserving privacy of claim 4, wherein the estimated state is sent to a database.

8. The method of monitoring traffic data while preserving privacy of claim 7, wherein the estimated state is sent to a database using multi-hop communications between fixed nodes of a fixed transmitter infrastructure.

9. The method of monitoring traffic data while preserving privacy of claim 7, wherein the transmitter relays and forwards data to fixed nodes of a fixed transmitter infrastructure.

10. The method of monitoring traffic data while preserving privacy of claim 1, wherein the transmitter is decoupled from phone and satellite devices.

11. The method of monitoring traffic data while preserving privacy of claim 1, wherein the transmitter signal is received by a fixed sensor network.

12. The method of monitoring traffic data while preserving privacy of claim 1, wherein the position is estimated by one or more of trilateration, received signal strength measuring, and a tracking device coupled to the transmitter.

13. A traffic monitoring system for monitoring and mapping traffic flow while preserving privacy, comprising:
a mobile transmitter comprising a transmitter microcontroller and a wireless transmitter, the mobile transmitter configured to transmit speed information associated with the mobile transmitter; and
a fixed transmitter infrastructure comprising stations with fixed locations for receiving the speed information, wherein each of the stations comprises a station microcontroller and a wireless station transmitter;
wherein the fixed transmitter infrastructure estimates a position of the mobile transmitter,
wherein the traffic monitoring system does not collect or store any personal identifying information associated with the mobile transmitter, wherein the mobile transmitter and the fixed transmitter infrastructure are tuned to operate on the same frequency, which is not shared by cellular phones, wherein the traffic monitoring system is configured to create traffic data based on the received speed information and the position of the mobile transmitter, and wherein the traffic data comprises a density and speed map.

14. The traffic monitoring system of claim 13, wherein the mobile transmitter is integrated into a vehicle.

15. The traffic monitoring system of claim 14, wherein the mobile transmitter is powered by the vehicle.

16. The traffic monitoring system of claim 15, wherein the mobile transmitter is configured to obtain vehicle speed data from the vehicle.

17. The traffic monitoring system of claim 16, wherein the fixed transmitter infrastructure is configured to receive data from the mobile transmitter, to estimate a position of the vehicle, and to map the position to a road.

18. The traffic monitoring system of claim 17, further comprising at least one additional mobile transmitter.

19. The traffic monitoring system of claim 18, wherein the fixed transmitter infrastructure is configured to monitor any or all of the mobile transmitter and the one additional mobile transmitter when whichever of the mobile transmitter and the at least one additional mobile transmitter are within communication range.

20. The traffic monitoring system of claim 13, wherein the traffic monitoring system is configured to estimate a state of local traffic based on the traffic data.

21. The traffic monitoring system of claim 19, wherein the traffic monitoring system is configured to estimate a state of local traffic using a data fusion technique.

22. The traffic monitoring system of claim 19, wherein the data fusion technique is mixed-integer linear programming.

23. The traffic monitoring system of claim 19, wherein all of the mobile transmitter and the at least one additional mobile transmitter are vehicle components which are not configured to store or gather personal identifying information.

24. The traffic monitoring system of claim 16, further comprising at least one additional mobile transmitter.

25. The traffic monitoring system of claim 24, wherein the transmitter and the at least one additional mobile transmitter are configured to communicate with one another.

26. The traffic monitoring system of claim 25, wherein the transmitter and the at least one additional transmitter are configured to act as relays for forwarding data to the station when one or more of the transmitter and the at least one additional transmitter are beyond communication range of the fixed transmitter infrastructure.

27. The traffic monitoring system of claim 13, wherein the fixed transmitter infrastructure comprises a plurality of stations, each with a unique fixed location.

28. The traffic monitoring system of claim 27, wherein the fixed transmitter infrastructure is configured to receive data from the mobile transmitter and map the position.

29. The traffic monitoring system of claim 28, wherein the fixed transmitter infrastructure is configured to monitor the mobile transmitter when the mobile transmitter is within communication range, and wherein the traffic monitoring system is configured to create traffic data based on the monitoring.

30. The traffic monitoring system of claim 29, wherein the traffic monitoring system does not collect or store any personal identifying information.

31. The traffic monitoring system of claim 30, wherein the traffic monitoring system is configured to estimate a state of local traffic based on the traffic data.

32. The traffic monitoring system of claim 30, wherein the traffic monitoring system is configured to estimate a state of local traffic using mixed-integer linear programming.

33. The traffic monitoring system of claim 13, wherein the system is decoupled from phone and satellite devices.

34. The traffic monitoring system of claim 13, wherein the mobile transmitter comprises a back end, a front end, or both, wherein the back end transforms data for modulation onto a wireless carrier, and wherein the front end comprises an integrated circuit.

35. A method of monitoring traffic data while preserving privacy, comprising:

providing at least one transmitter associated with a vehicle, wherein the at least one transmitter is configured to transmit data that includes speed information of the vehicle;

providing a fixed transmitter infrastructure configured to receive the data from the at least one transmitter and estimating a position of the at least one transmitter; and creating traffic data based on the speed information and the estimated position of the at least one transmitter, wherein a traffic monitoring system that includes the at least one transmitter and the fixed transmitter infrastructure does not collect or store any personal identifying information associated with the vehicle and occupants of the vehicle, the fixed transmitter infrastructure and the at least one transmitter are tuned on one or more frequencies that are not shared by cellular phones, and wherein the traffic data comprises a density and speed map.

36. The method of monitoring traffic data while preserving privacy of claim 35, wherein each of the at least one transmitter is decoupled from phone and satellite devices.

37. The method of monitoring traffic data while preserving privacy of claim 35, wherein each of the at least one transmitter comprises a transmitter microcontroller and a half duplex wireless transmitter.

38. The method of monitoring traffic data while preserving privacy of claim 37, wherein the fixed transmitter infrastructure comprises at least one fixed station and wherein each of the at least one fixed station comprises a fixed station microcontroller and one of a fixed station half duplex wireless transmitter and a fixed station full duplex wireless transmitter.

39. The method of monitoring traffic data while preserving privacy of claim 38, further comprising: integrating each of the at least one transmitter into separate vehicles, wherein each of the at least one transmitters is powered by the vehicle into which the at least one transmitter is integrated;

wherein the fixed transmitter infrastructure and each of the at least one transmitter are tuned to operate on the same frequency.

40. The method of monitoring traffic data while preserving privacy of claim 39, further comprising:

measuring vehicle speed and vehicle position of each vehicle within the communication range of the fixed transmitter infrastructure or the at least one transmitter; and mapping the position of each vehicle.

41. The method of monitoring traffic data while preserving privacy of claim 39, wherein each of the at least one transmitter acts as a relay when outside the communication range of the fixed transmitter infrastructure in order to forward measured data to a database using multi-hop communications.

42. The method of monitoring traffic data while preserving privacy of claim 39, wherein no personal identifying information is collected or stored during monitoring traffic speed and density.

43. The method of monitoring traffic data while preserving privacy of claim 39, wherein none of the at least one transmitter is coupled to phone or satellite devices.

* * * * *